(12) United States Patent
Lin

(10) Patent No.: US 9,237,614 B2
(45) Date of Patent: Jan. 12, 2016

(54) CAPACITANCE AMPLIFYING CIRCUIT APPLIED TO A CONTROLLER OF A POWER CONVERTOR AND OPERATION METHOD THEREOF

(71) Applicant: Leadtrend Technology Corp., Hsin-Chu (TW)

(72) Inventor: Chung-Wei Lin, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/622,904

(22) Filed: Feb. 15, 2015

(65) Prior Publication Data
US 2015/0237690 A1 Aug. 20, 2015

(30) Foreign Application Priority Data
Feb. 19, 2014 (TW) .............................. 103105547 A

(51) Int. Cl.
*H05B 37/02* (2006.01)
*H05B 33/08* (2006.01)

(52) U.S. Cl.
CPC ........ *H05B 33/0812* (2013.01); *H05B 33/0815* (2013.01); *H05B 33/0845* (2013.01)

(58) Field of Classification Search
CPC ............ H03F 2203/45458; H03F 1/34; H03F 2200/513; H03F 3/345; H03F 3/45179; H03F 3/245; H03F 2200/387; H03F 2200/108; H02M 5/293; H02M 3/156; H02M 1/4208; H05B 6/685; H03G 3/3042
See application file for complete search history.

(56) References Cited

U.S. PATENT DOCUMENTS

| 2007/0285173 A1* | 12/2007 | Jung | H01G 4/40 330/302 |
| 2010/0259237 A1* | 10/2010 | Wang | H03F 1/14 323/282 |
| 2012/0112644 A1* | 5/2012 | Lin | H05B 33/0848 315/185 R |
| 2014/0077779 A1* | 3/2014 | Cheng | G05F 1/46 323/282 |
| 2015/0028752 A1* | 1/2015 | Yau | H05B 33/0821 315/185 R |

FOREIGN PATENT DOCUMENTS

TW 201242432 10/2012
TW 201401919 1/2014

* cited by examiner

*Primary Examiner* — Jany Richardson
(74) *Attorney, Agent, or Firm* — Winston Hsu; Scott Margo

(57) ABSTRACT

A capacitance amplifying circuit applied to a controller of a power convertor includes a comparison unit and a capacitance amplifying module. The comparison unit receives a feedback voltage corresponding to a load coupled to the power convertor, a dimming signal, and a reference voltage, and outputs a compensation current. The capacitance amplifying module generates an equivalent capacitor. A capacitance of the equivalent capacitor is K times to a capacitance of a reference capacitor of the capacitance amplifying module, and K is a real number greater than 1. The compensation current and the equivalent capacitor are used for determining a compensation voltage, and when the dimming signal is disabled, a closed loop within the capacitance amplifying module is changed to an open loop to keep the compensation voltage at a fixed value.

8 Claims, 5 Drawing Sheets

CAPACITANCE AMPLIFYING CIRCUIT APPLIED TO A CONTROLLER OF A POWER CONVERTOR AND OPERATION METHOD THEREOF

BACKGROUND OF THE INVENTION

1. Field of the Invention

The present invention relates to a capacitance amplifying circuit applied to a controller of a power convertor and an operation method thereof, and particularly to a capacitance amplifying circuit and an operation method thereof that can make a compensation voltage within a capacitance amplifying circuit be not continuously increased or decreased with offset and leakage of a transconductance amplifying unit when a dimming signal is disabled.

2. Description of the Prior Art

In the prior art, a controller applied to a power convertor has a compensation pin to couple to an external compensation capacitor, wherein the controller can generate a compensation voltage at the compensation pin according to the external compensation capacitor, a reference voltage, and a dimming signal, and provide the compensation voltage to a gate driving circuit within the controller. Then, the gate driving circuit within the controller can generate a gate control signal according to the compensation voltage, and output the gate control signal to a power switch of the power convertor. Thus, the power switch can be turned on and turned off to have a dimming function according to the gate control signal.

However, in highly integrated trend of integrated circuits today, the external compensation capacitor outside the controller and the compensation pin of the controller will increase cost of the controller, resulting in the controller with the external compensation capacitor and the compensation pin losing competitiveness. Therefore, how to integrate the external compensation capacitor into the controller and remove the compensation pin of the controller becomes an important issue of a designer of the controller.

SUMMARY OF THE INVENTION

An embodiment provides a capacitance amplifying circuit applied to a controller of a power convertor. The capacitance amplifying circuit includes a comparison unit and a capacitance amplifying module. The comparison unit is used for receiving a feedback voltage corresponding to a load coupled to the power convertor, a dimming signal, and a reference voltage, and outputting a compensation current according to the feedback voltage and the reference voltage, wherein when the dimming signal is disabled, the comparison unit turned off. The capacitance amplifying module is coupled to the comparison unit for generating an equivalent capacitor, wherein a capacitance of the equivalent capacitor is K times to a capacitance of a reference capacitor of the capacitance amplifying module, and K is a real number greater than 1; wherein the compensation current and the equivalent capacitor are used for determining a compensation voltage, and when the dimming signal is disabled, a closed loop coupled to the comparison unit within the capacitance amplifying module is changed to an open loop to keep the compensation voltage at a fixed value.

Another embodiment provides an operation method of a capacitance amplifying circuit applied to a controller of a power convertor, wherein the capacitance amplifying circuit includes a comparison unit and a capacitance amplifying module. The operation method includes the comparison unit receiving a feedback voltage corresponding to a load coupled to the power convertor, a dimming signal, and a reference voltage; the comparison unit outputting a compensation current according to the feedback voltage and the reference voltage when the dimming signal is enabled; the capacitance amplifying module utilizing a closed loop within the capacitance amplifying module to generate an equivalent capacitor when the dimming signal is enabled, wherein a capacitance of the equivalent capacitor is K times to a capacitance of a reference capacitor of the capacitance amplifying module, and K is a real number greater than 1; and the capacitance amplifying circuit determining a compensation voltage according to the compensation current and the equivalent capacitor.

Another embodiment provides an operation method of a capacitance amplifying circuit applied to a controller of a power convertor, wherein the capacitance amplifying circuit includes a comparison unit and a capacitance amplifying module. The operation method includes the comparison unit receiving a feedback voltage corresponding to a load coupled to the power convertor, a dimming signal, and a reference voltage; the comparison unit being turned off when the dimming signal is disabled; a closed loop within the capacitance amplifying module being changed to an open loop when the dimming signal is disabled; and the capacitance amplifying circuit utilizing the open loop to keep a compensation voltage outputted by the comparison unit at a fixed value.

The present invention provides a capacitance amplifying circuit applied to a controller of a power convertor and an operation method thereof. The capacitance amplifying circuit and the operation method utilize a closed loop within a capacitance amplifying module to amplify a capacitance of a reference capacitor. Further, when a dimming signal is disabled, because the closed loop within the capacitance amplifying module is changed to an open loop, a compensation voltage of an output terminal of a comparison unit is not continuously increased or decreased with offset and leakage within a transconductance amplifying unit. Therefore, compared to the prior art, the present invention can remove a compensation pin of the controller originally coupled to an external compensation capacitor (located outside the capacitance amplifying circuit), can remove the external compensation capacitor because the capacitance amplifying module amplifies the capacitance of the reference capacitor, and can make the compensation voltage of the output terminal of the comparison unit be not continuously increased or decreased with the offset and leakage within the transconductance amplifying unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
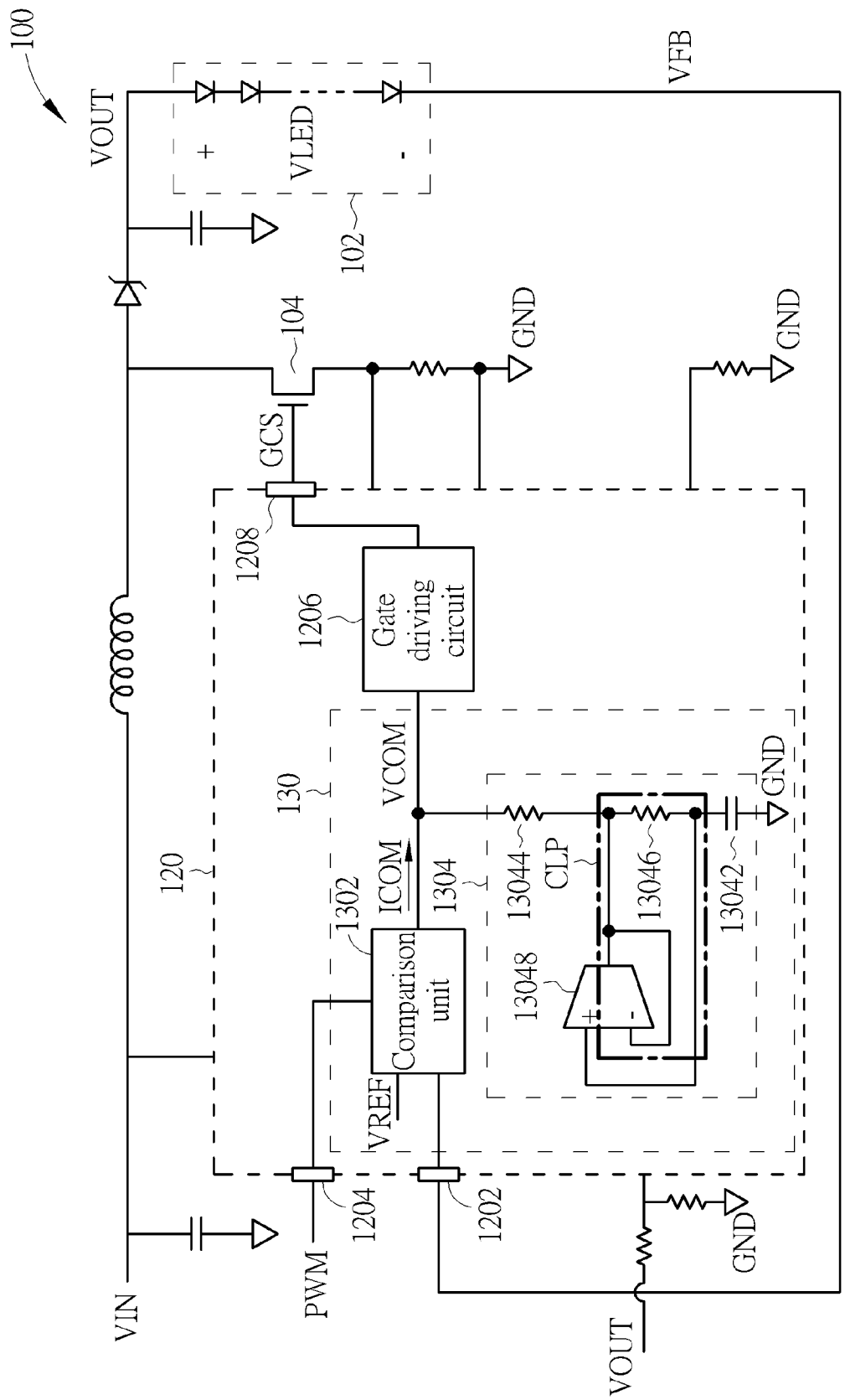
FIG. 1 is a diagram illustrating a capacitance amplifying circuit applied to a controller of a power convertor according to the first embodiment.

Please refer to FIG. 1. FIG. 1 is a diagram illustrating a capacitance amplifying circuit 130 applied to a controller 120 of a power convertor 100 according to the first embodiment. The capacitance amplifying circuit 130 includes a comparison unit 1302 and a capacitance amplifying module 1304, wherein the comparison unit 1302 and the capacitance amplifying module 1304 are integrated circuits. As shown in FIG. 1, the power convertor 100 is a direct current-to-alternating current (DC-to-AC) boost power convertor (non-isolated power convertor). But, the present invention is not limited to the power convertor 100 being a DC-to-AC boost power convertor, and is also not limited to the power convertor 100 being a non-isolated power convertor. That is to say, in another embodiment of the present invention, the power convertor 100 can be a Buck convertor, or the power convertor 100 can be a Buck-Boost convertor, a Cuk convertor, a Sepic convertor, a Zeta convertor, a Flyback convertor, a Forward convertor, a Push-Pull convertor, a Half-Bridge convertor, or a Full-Bridge convertor. As shown in FIG. 1, the power convertor 100 can boost an input voltage VIN to generate an output voltage VOUT, and provide the output voltage VOUT to a load 102 (e.g. a series of light emitting diodes). As shown in FIG. 1, the comparison unit 1302 is used for receiving a feedback voltage VFB corresponding to the load 102 coupled to the power convertor 100 through a feedback pin 1202 of the controller 120, receiving a dimming signal PWM through a dimming pin 1204 of the controller 120, and receiving a reference voltage VREF, and outputting a compensation current ICOM according to the feedback voltage VFB (equal to the output voltage VOUT minus a voltage drop VLED of the load 102) and the reference voltage VREF, wherein when the dimming signal PWM is disabled, the comparison unit 1302 is turned off. In one embodiment of the present invention, the comparison unit 1302 is a transconductance amplifier. The capacitance amplifying module 1304 is coupled to the comparison unit 1302 for generating an equivalent capacitor Ceq, wherein a capacitance of the equivalent capacitor Ceq is K times to a capacitance C1 of a reference capacitor 13042 of the capacitance amplifying module 1304, and K is a real number greater than 1.

As shown in FIG. 1, the comparison unit 1302 has a first input terminal, a second input terminal, a third input terminal, and an output terminal. The first input terminal of the comparison unit 1302 is used for receiving the feedback voltage VFB, the second input terminal of the comparison unit 1302 is used for receiving the reference voltage VREF, the third input terminal of the comparison unit 1302 is used for receiving the dimming signal PWM, and the output terminal of the comparison unit 1302 is used for outputting the compensation current ICOM, wherein the compensation current ICOM outputted by the comparison unit 1302 and the equivalent capacitor Ceq generated by the capacitance amplifying module 1304 are used for determining a compensation voltage VCOM, and the compensation voltage VCOM is provided to a gate driving circuit 1206 of the controller 120. Then, the gate driving circuit 1206 can generate a gate control signal GCS according to the compensation voltage VCOM, and transmit the gate control signal GCS to a power switch 104 of the power convertor 100 through a gate pin 1208 of the controller 120. Thus, the power switch 104 can be turned on and turned off according to the gate control signal GCS.

As shown in FIG. 1, the capacitance amplifying module 1304 includes a first resistor 13044, a second resistor 13046, a transconductance amplifying unit 13048, and the reference capacitor 13042. The first resistor 13044 has a first terminal and a second terminal, wherein the first terminal of the first resistor 13044 is coupled to the output terminal of the comparison unit 1302; the second resistor 13046 has a first terminal and a second terminal, wherein the first terminal of the second resistor 13046 is coupled to the second terminal of the first resistor 13044; the transconductance amplifying unit 13048 has a first input terminal, a second input terminal, and an output terminal, wherein the first input terminal of the transconductance amplifying unit 13048 is coupled to the second terminal of the second resistor 13046, and the second input terminal of the transconductance amplifying unit 13048 is coupled to the second terminal of the first resistor 13044; and the reference capacitor 13042 has a first terminal and a second terminal, wherein the first terminal of the reference capacitor 13042 is coupled to the second terminal of the second resistor 13046, and the first terminal of the reference capacitor 13042 is coupled to ground GND. Further, the capacitance amplifying module 1304 can generate the equivalent capacitor Ceq according to a resistance R2 of the second resistor 13046, the capacitance C1 of the reference capacitor 13042, a transconductance GM of the transconductance amplifying unit 13048, and equation (1):

$$Ceq = GM*R2*C1 = K*C1 \quad (1)$$

$$GM*R2 = K \quad (2)$$

As shown in equation (2), because GM*R2 is equal to K, GM*R2 is greater than 1.

As shown in FIG. 1 and equation (1), the capacitance amplifying module 1304 utilizes a closed loop CLP coupled to the comparison unit 1302 within the capacitance amplifying module 1304 to amplify the capacitance C1 of the reference capacitor 13042. Thus, the present invention not only can remove a compensation pin of the controller 120 originally coupled to an external compensation capacitor (located outside the capacitance amplifying circuit 130), but can also remove the external compensation capacitor because the capacitance amplifying module 1304 can amplify the capacitance C1 of the reference capacitor 13042. Because the present invention can remove the compensation pin of the controller 120, the present invention can reduce cost of the controller 120.

As shown in FIG. 1, because when the dimming signal PWM is disabled, the comparison unit 1302 is turned off, meanwhile, the output terminal of the comparison unit 1302 is a high impedance point (floating). Thus, when the dimming signal PWM is disabled, the compensation voltage VCOM of the output terminal of the comparison unit 1302 is easily influenced by offset and leakage within the transconductance amplifying unit 13048, resulting in the compensation voltage VCOM of the output terminal of the comparison unit 1302 being out of control when the dimming signal PWM is disabled. Therefore, when the dimming signal PWM is disabled, the compensation voltage VCOM is continuously increased or decreased with the offset and leakage within the transconductance amplifying unit 13048. Thus, when a frequency of the dimming signal PWM is very slow or disabled time of the dimming signal PWM is extended, the incontrollable compensation voltage VCOM will influence transient response of the gate control signal GCS when the dimming signal PWM is enabled next time.

Figure 2:
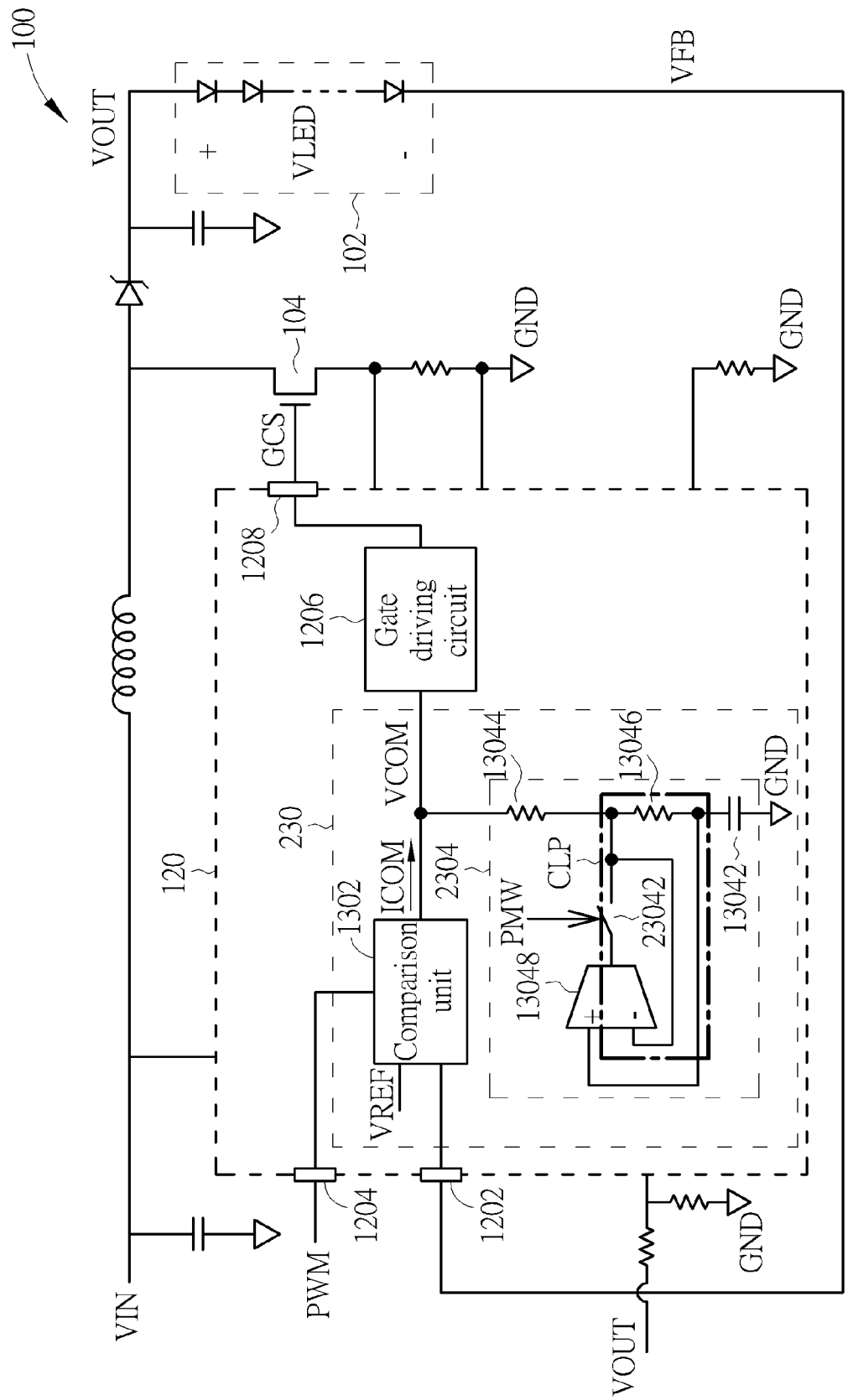
FIG. 2 is a diagram illustrating a capacitance amplifying circuit applied to the controller of the power convertor according to the second embodiment.

Please refer to FIG. 2. FIG. 2 is a diagram illustrating a capacitance amplifying circuit 230 applied to the controller 120 of the power convertor 100 according to the second embodiment. As shown in FIG. 2, the capacitance amplifying circuit 230 includes the comparison unit 1302 and a capacitance amplifying module 2304, wherein a difference between the capacitance amplifying module 2304 and the capacitance amplifying module 1304 is that the capacitance amplifying module 2304 further includes a first switching unit 23042. As shown in FIG. 2, the first switching unit 23042 has a first terminal, a second terminal, and a third terminal, wherein the first terminal of the first switching unit 23042 is coupled to the output terminal of the transconductance amplifying unit 13048, the second terminal of the first switching unit 23042 is used for receiving the dimming signal PWM, and the third terminal of the first switching unit 23042 is coupled to the second terminal of the first resistor 13044 and the second input terminal of the transconductance amplifying unit 13048, wherein the first switching unit 23042 is turned on and turned off according to the dimming signal PWM. As shown in FIG. 2, when the dimming signal PWM is disabled, because the first switching unit 23042 is turned off, a closed loop CLP coupled to the comparison unit 1302 within the capacitance amplifying module 2304 is changed to an open loop, resulting in the compensation voltage VCOM of the output terminal of the comparison unit 1302 being not continuously increased or decreased with the offset and leakage within the transconductance amplifying unit 13048. Thus, the capacitance amplifying circuit 230 can keep the compensation voltage VCOM of the output terminal of the comparison unit 1302 at a fixed value. Therefore, when the frequency of the dimming signal PWM is very slow or the disabled time of the dimming signal PWM is extended, the controllable compensation voltage VCOM does not influence the transient response of the gate control signal GCS when the dimming signal PWM is enabled next time. Further, subsequent operational principles of the capacitance amplifying circuit 230 are the same as those of the capacitance amplifying circuit 130, so further description thereof is omitted for simplicity.

Figure 3:
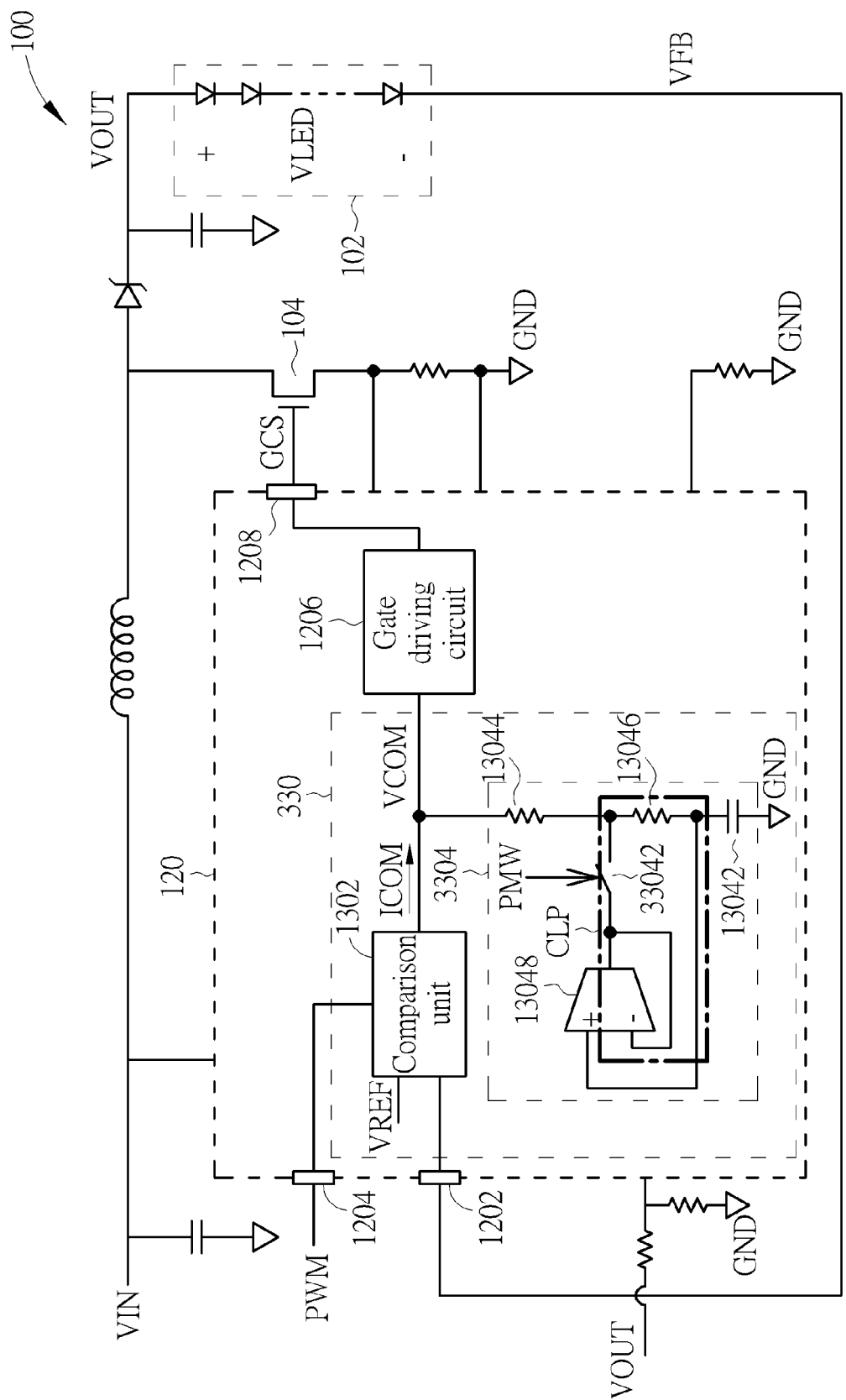
FIG. 3 is a diagram illustrating a capacitance amplifying circuit applied to the controller of the power convertor according to the third embodiment.

Please refer to FIG. 3. FIG. 3 is a diagram illustrating a capacitance amplifying circuit 330 applied to the controller 120 of the power convertor 100 according to the third embodiment. As shown in FIG. 3, the capacitance amplifying circuit 330 includes the comparison unit 1302 and a capacitance amplifying module 3304, wherein a difference between the capacitance amplifying module 3304 and the capacitance amplifying module 1304 is that the capacitance amplifying module 3304 further includes a first switching unit 33042. As shown in FIG. 3, the first switching unit 33042 has a first terminal, a second terminal, and a third terminal, wherein the first terminal of the first switching unit 33042 is coupled to the output terminal of the transconductance amplifying unit 13048, the second terminal of the first switching unit 33042 is used for receiving the dimming signal PWM, and the third terminal of the first switching unit 33042 is coupled to the second terminal of the first resistor 13044, wherein the first switching unit 33042 is turned on and turned off according to the dimming signal PWM. As shown in FIG. 3, when the dimming signal PWM is disabled, because the first switching unit 33042 is turned off, a closed loop CLP coupled to the comparison unit 1302 within the capacitance amplifying module 3304 is changed to an open loop, resulting in the compensation voltage VCOM being not continuously increased or decreased with the offset and leakage within the transconductance amplifying unit 13048. However, as shown in FIG. 3, when the dimming signal PWM is disabled, the transconductance amplifying unit 13048 still can be a unit gain buffer. Therefore, when the dimming signal PWM is enabled again, the closed loop CLP coupled to the comparison unit 1302 within the capacitance amplifying module 3304 can immediately operate again to accelerate the transient response of the gate control signal GCS when the dimming signal PWM is enabled next time. Further, subsequent operational principles of the capacitance amplifying circuit 330 are the same as those of the capacitance amplifying circuit 130, so further description thereof is omitted for simplicity.

Figure 4:
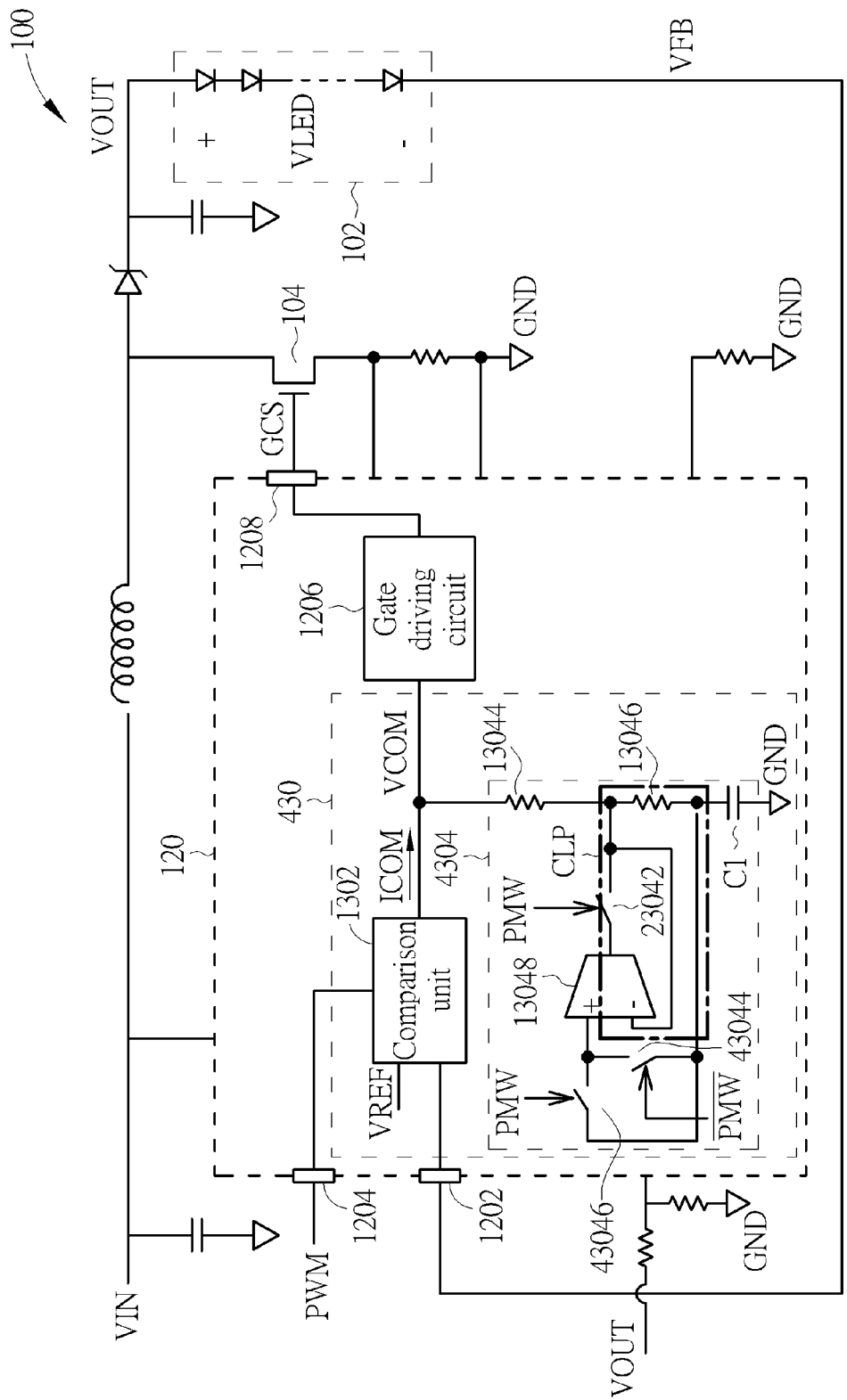
FIG. 4 is a diagram illustrating a capacitance amplifying circuit applied to the controller of the power convertor according to the fourth embodiment.

Please refer to FIG. 4. FIG. 4 is a diagram illustrating a capacitance amplifying circuit 430 applied to the controller 120 of the power convertor 100 according to the fourth embodiment. As shown in FIG. 4, the capacitance amplifying circuit 430 includes the comparison unit 1302 and a capacitance amplifying module 4304, wherein a difference between the capacitance amplifying module 4304 and the capacitance amplifying module 2304 is that the capacitance amplifying module 4304 further includes a second switching unit 43044 and a third switching unit 43046. As shown in FIG. 4, the second switching unit 43044 has a first terminal, a second terminal, and a third terminal, wherein the first terminal of the second switching unit 43044 is coupled to the first input terminal of the transconductance amplifying unit 13048, the second terminal of the second switching unit 43044 is used for receiving an inverse dimming signal $\overline{PWM}$, and the third terminal of the second switching unit 43044 is coupled to the second terminal of the second resistor 13046, wherein the second switching unit 43044 is turned on and turned off according to the inverse dimming signal $\overline{PWM}$; and the third switching unit 43046 has a first terminal, a second terminal, and a third terminal, wherein the first terminal of the third switching unit 43046 is coupled to the second terminal of the second resistor 13046, the second terminal of the third switching unit 43046 is sued for receiving the dimming signal PWM, and the third terminal of the third switching unit 43046 is coupled to the first terminal of the second switching unit 43044 and the first input terminal of the transconductance amplifying unit 13048, wherein the third switching unit 43046 is turned on and turned off according to dimming signal PWM. As shown in FIG. 4, when the dimming signal PWM is disabled (the inverse dimming signal $\overline{PWM}$ is enabled), because the first switching unit 23042 and the third switching unit 43046 are turned off, a closed loop CLP coupled to the comparison unit 1302 within the capacitance amplifying module 4304 is changed to an open loop, resulting in the compensation voltage VCOM of the output terminal of the comparison unit 1302 being not continuously increased or decreased with the offset and leakage within the transconductance amplifying unit 13048. However, as shown in FIG. 4, when the dimming signal PWM is disabled (the inverse dimming signal $\overline{PWM}$ is enabled), the first input terminal of the transconductance amplifying unit 13048 and the second input terminal of the transconductance amplifying unit 13048 are short circuited due to turning-on of the second switching unit 43044. Therefore, when the dimming signal PWM is enabled again, the closed loop CLP coupled to the comparison unit 1302 within the capacitance amplifying module 4304 can immediately operate again to accelerate the transient response of the gate control signal GCS when the dimming signal PWM is enabled next time. Further, subsequent operational principles of the capacitance amplifying circuit 430 are the same as those of the capacitance amplifying circuit 230, so further description thereof is omitted for simplicity.

Figure 5:
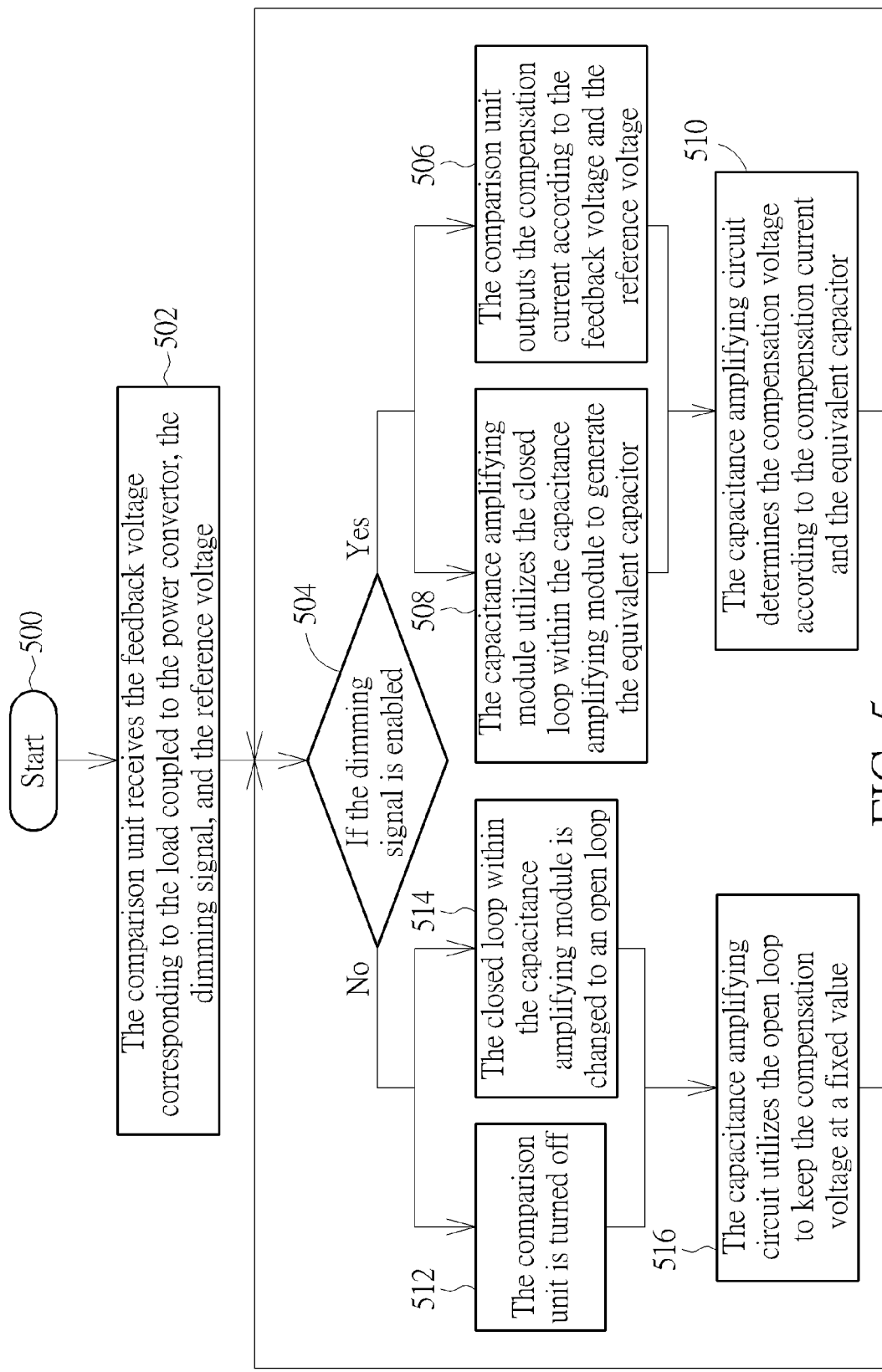
FIG. 5 is a flowchart illustrating an operation method of a capacitance amplifying circuit applied to a controller of a power convertor according to a fifth embodiment.

Please refer to FIG. 2 and FIG. 5. FIG. 5 is a flowchart illustrating an operation method of a capacitance amplifying circuit applied to a controller of a power convertor according to a fifth embodiment. The method in FIG. 5 is illustrated using the capacitance amplifying circuit 230 in FIG. 2. Detailed steps are as follows:

Step 500: Start.

Step 502: The comparison unit 1302 receives the feedback voltage VFB corresponding to the load 102 coupled to the power convertor 100, the dimming signal PWM, and the reference voltage VREF.

Step 504: If the dimming signal PWM is enabled; if yes, go to Step 506 and Step 508; if no, go to Step 512 and Step 514.

Step 506: The comparison unit 1302 outputs the compensation current ICOM according to the feedback voltage VFB and the reference voltage VREF.

Step 508: The capacitance amplifying module 2304 utilizes the closed loop CLP within the capacitance amplifying module 2304 to generate the equivalent capacitor Ceq.

Step 510: The capacitance amplifying circuit 230 determines the compensation voltage VCOM according to the compensation current ICOM and the equivalent capacitor Ceq, go to Step 504.

Step 512: The comparison unit 1302 is turned off.

Step 514: The closed loop CLP within the capacitance amplifying module 2304 is changed to an open loop.

Step 516: The capacitance amplifying circuit 230 utilizes the open loop to keep the compensation voltage VCOM at a fixed value, go to Step 504.

In Step 502, as shown in FIG. 2, the comparison unit 1302 receives the feedback voltage VFB (equal to the output voltage VOUT minus the voltage drop VLED of the load 102) corresponding to the load 102 coupled to the power convertor 100 through the feedback pin 1202 of the controller 120, receives the dimming signal PWM through the dimming pin 1204 of the controller 120, and receives the reference voltage VREF. In Step 506, the comparison unit 1302 can output the compensation current ICOM according to the feedback voltage VFB and the reference voltage VREF. In Step 508, the capacitance amplifying module 2304 can generate the equivalent capacitor Ceq according to the resistance R2 of the second resistor 13046, the capacitance C1 of the reference capacitor 13042, the transconductance GM of the transconductance amplifying unit 13048, and equation (1), wherein the capacitance of the equivalent capacitor Ceq is K times to the capacitance C1 of the reference capacitor 13042, and K is a real number greater than 1. That is to say, as shown in FIG. 2 and equation (1), the capacitance amplifying module 2304 utilizes the closed loop CLP within the capacitance amplifying module 2304 to amplify the capacitance C1 of the reference capacitor 13042. In Step 510, the compensation current ICOM outputted by the comparison unit 1302 and the equivalent capacitor Ceq generated by the capacitance amplifying module 1304 can determine the compensation voltage VCOM, and the compensation voltage VCOM is provided to the gate driving circuit 1206 of the controller 120. Then, the gate driving circuit 1206 can generate the gate control signal GCS according to the compensation voltage VCOM, and transmit the gate control signal GCS to the power switch 104 of the power convertor 100 through the gate pin 1208 of the controller 120. Thus, the power switch 104 can be turned on and turned off according to the gate control signal GCS.

In Step 512, when the dimming signal PWM is disabled, the comparison unit 1302 is turned off. In Step 514, as shown in FIG. 2, when the dimming signal PWM is disabled, because the first switching unit 23042 is turned off, the closed loop coupled to the comparison unit 1302 within the capacitance amplifying module 2304 is changed to the open loop, resulting in the compensation voltage VCOM being not continuously increased or decreased with the offset and leakage within the transconductance amplifying unit 13048. Thus, in Step 516, the capacitance amplifying circuit 230 can keep the compensation voltage VCOM of the output terminal of the comparison unit 1302 at the fixed value. Therefore, when the frequency of the dimming signal PWM is very slow or the disabled time of the dimming signal PWM is extended, the controllable compensation voltage VCOM does not influence the transient response of the gate control signal GCS when the dimming signal PWM is enabled next time. Further, subsequent operational principles of the capacitance amplifying circuit 330 and the capacitance amplifying circuit 430 are the same as those of the capacitance amplifying circuit 230, so further description thereof is omitted for simplicity.

To sum up, the capacitance amplifying circuit and the operation method thereof utilize the closed loop within the capacitance amplifying module to amplify the capacitance of the reference capacitor. Further, when the dimming signal is disabled, because the closed loop within the capacitance amplifying module is changed to the open loop, the compensation voltage of the output terminal of the comparison unit is not continuously increased or decreased with the offset and leakage within the transconductance amplifying unit. Therefore, compared to the prior art, the present invention can remove the compensation pin of the controller originally coupled to the external compensation capacitor (located outside the capacitance amplifying circuit), can remove the external compensation capacitor because the capacitance amplifying module amplifies the capacitance of the reference capacitor, and can make the compensation voltage of the output terminal of the comparison unit be not continuously increased or decreased with the offset and leakage within the transconductance amplifying unit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A capacitance amplifying circuit applied to a controller of a power convertor, the capacitance amplifying circuit comprising:
  a comparison unit for receiving a feedback voltage corresponding to a load coupled to the power convertor, a dimming signal, and a reference voltage, and outputting a compensation current according to the feedback voltage and the reference voltage, wherein when the dimming signal is disabled, the comparison unit is turned off; and
  a capacitance amplifying module coupled to the comparison unit for generating an equivalent capacitor, wherein a capacitance of the equivalent capacitor is K times to a capacitance of a reference capacitor of the capacitance amplifying module, and K is a real number greater than 1; wherein the compensation current and the equivalent capacitor are used for determining a compensation voltage, and when the dimming signal is disabled, a closed loop coupled to the comparison unit within the capacitance amplifying module is changed to an open loop to keep the compensation voltage at a fixed value.

2. The capacitance amplifying circuit of claim 1, wherein the comparison unit has a first input terminal, a second input terminal, a third input terminal, and an output terminal, wherein the first input terminal of the comparison unit is used for receiving the feedback voltage, the second input terminal of the comparison unit is used for receiving the reference voltage, the third input terminal of the comparison unit is used for receiving the dimming signal, and the output terminal of the comparison unit is used for outputting the compensation current.

3. The capacitance amplifying circuit of claim 2, wherein the capacitance amplifying module comprises:
  a first resistor having a first terminal and a second terminal, wherein the first terminal of the first resistor is coupled to the output terminal of the comparison unit;
  a second resistor having a first terminal and a second terminal, wherein the first terminal of the second resistor is coupled to the second terminal of the first resistor;

a transconductance amplifying unit having a first input terminal, a second input terminal, and an output terminal, wherein the first input terminal of the transconductance amplifying unit is coupled to the second terminal of the second resistor, and the second input terminal of the transconductance amplifying unit is coupled to the second terminal of the first resistor;

a first switching unit having a first terminal, a second terminal, and a third terminal, wherein the first terminal of the first switching unit is coupled to the output terminal of the transconductance amplifying unit, the second terminal of the first switching unit is used for receiving the dimming signal, and the third terminal of the first switching unit is coupled to the second terminal of the first resistor and the second input terminal of the transconductance amplifying unit, wherein the first switching unit is turned on and turned off according to the dimming signal; and the reference capacitor having a first terminal and a second terminal, wherein the first terminal of the reference capacitor is coupled to the second terminal of the second resistor, and the second terminal of the reference capacitor is coupled to ground.

4. The capacitance amplifying circuit of claim 2, wherein the capacitance amplifying module comprises:

a first resistor having a first terminal and a second terminal, wherein the first terminal of the first resistor is coupled to the output terminal of the comparison unit;

a second resistor having a first terminal and a second terminal, wherein the first terminal of the second resistor is coupled to the second terminal of the first resistor;

a transconductance amplifying unit having a first input terminal, a second input terminal, and an output terminal, wherein the first input terminal of the transconductance amplifying unit is coupled to the second terminal of the second resistor, and the second input terminal of the transconductance amplifying unit is coupled to the output terminal of the transconductance amplifying unit;

a first switching unit having a first terminal, a second terminal, and a third terminal, wherein the first terminal of the first switching unit is coupled to the output terminal of the transconductance amplifying unit, the second terminal of the first switching unit is used for receiving the dimming signal, and the third terminal of the first switching unit is coupled to the second terminal of the first resistor, wherein the first switching unit is turned on and turned off according to the dimming signal; and the reference capacitor having a first terminal and a second terminal, wherein the first terminal of the reference capacitor is coupled to the second terminal of the second resistor, and the second terminal of the reference capacitor is coupled to ground.

5. The capacitance amplifying circuit of claim 2, wherein the capacitance amplifying module comprises:

a first resistor having a first terminal and a second terminal, wherein the first terminal of the first resistor is coupled to the output terminal of the comparison unit;

a second resistor having a first terminal and a second terminal, wherein the first terminal of the second resistor is coupled to the second terminal of the first resistor;

a transconductance amplifying unit having a first input terminal, a second input terminal, and an output terminal;

a first switching unit having a first terminal, a second terminal, and a third terminal, wherein the first terminal of the first switching unit is coupled to the output terminal of the transconductance amplifying unit, the second terminal of the first switching unit is used for receiving the dimming signal, and the third terminal of the first switching unit is coupled to the second terminal of the first resistor and the second input terminal of the transconductance amplifying unit, wherein the first switching unit is turned on and turned off according to the dimming signal;

a second switching unit having a first terminal, a second terminal, and a third terminal, wherein the first terminal of the second switching unit is coupled to the first input terminal of the transconductance amplifying unit, the second terminal of the second switching unit is used for receiving an inverse dimming signal, and the third terminal of the second switching unit is coupled to the second terminal of the second resistor, wherein the second switching unit is turned on and turned off according to the dimming signal;

a third switching unit having a first terminal, a second terminal, and a third terminal, wherein the first terminal of the third switching unit is coupled to the second terminal of the second resistor, the second terminal of third switching unit is used for receiving the dimming signal, and the third terminal of the third switching unit is coupled to the first terminal of the second switching unit and the first input terminal of the transconductance amplifying unit, wherein the third switching unit is turned on and turned off according to the dimming signal; and the reference capacitor having a first terminal and a second terminal, wherein the first terminal of the reference capacitor is coupled to the second terminal of the second resistor, the third terminal of the second switching unit, and the first terminal of the third switching unit, and the second terminal of the reference capacitor is coupled to ground.

6. The capacitance amplifying circuit of claim 1, wherein the comparison unit and the capacitance amplifying module are integrated circuits.

7. An operation method of a capacitance amplifying circuit applied to a controller of a power convertor, wherein the capacitance amplifying circuit comprises a comparison unit and a capacitance amplifying module, the operation method comprising:

the comparison unit receiving a feedback voltage corresponding to a load coupled to the power convertor, a dimming signal, and a reference voltage;

the comparison unit outputting a compensation current according to the feedback voltage and the reference voltage when the dimming signal is enabled;

the capacitance amplifying module utilizing a closed loop within the capacitance amplifying module to generate an equivalent capacitor when the dimming signal is enabled, wherein a capacitance of the equivalent capacitor is K times to a capacitance of a reference capacitor of the capacitance amplifying module, and K is a real number greater than 1; and the capacitance amplifying circuit determining a compensation voltage according to the compensation current and the equivalent capacitor.

8. An operation method of a capacitance amplifying circuit applied to a controller of a power convertor, wherein the capacitance amplifying circuit comprises a comparison unit and a capacitance amplifying module, the operation method comprising:

the comparison unit receiving a feedback voltage corresponding to a load coupled to the power convertor, a dimming signal, and a reference voltage;

the comparison unit being turned off when the dimming signal is disabled;

a closed loop within the capacitance amplifying module being changed to an open loop when the dimming signal is disabled; and the capacitance amplifying circuit utilizing the open loop to keep a compensation voltage outputted by the comparison unit at a fixed value.

\* \* \* \* \*